(12) United States Patent
Martucci

(10) Patent No.: US 9,993,957 B2
(45) Date of Patent: Jun. 12, 2018

(54) METHOD OF MAKING CONVOLUTED COATED BRAIDED HOSE ASSEMBLY

(71) Applicant: KA Group AG, Zürich (CH)

(72) Inventor: Norman S. Martucci, Clarkston, MI (US)

(73) Assignee: KA GROUP AG, Zurich (CH)

( * ) Notice: Subject to any disclaimer, the term of this patent is extended or adjusted under 35 U.S.C. 154(b) by 238 days.

(21) Appl. No.: 14/621,642

(22) Filed: Feb. 13, 2015

(65) Prior Publication Data
US 2015/0158234 A1 Jun. 11, 2015

Related U.S. Application Data

(60) Continuation of application No. 13/296,353, filed on Nov. 15, 2011, now abandoned, which is a division of application No. 12/355,191, filed on Jan. 16, 2009, now Pat. No. 8,418,729.

(51) Int. Cl.
| | | |
|---|---|---|
| B29C 49/00 | (2006.01) |
| B29C 53/30 | (2006.01) |
| F16L 11/112 | (2006.01) |
| F16L 11/115 | (2006.01) |
| B29C 49/22 | (2006.01) |
| B29C 49/46 | (2006.01) |
| B29K 105/06 | (2006.01) |
| B29K 105/08 | (2006.01) |
| B29K 105/00 | (2006.01) |
| B29K 705/00 | (2006.01) |
| B29L 23/18 | (2006.01) |
| B29L 31/00 | (2006.01) |
| B29K 27/12 | (2006.01) |
| B29K 305/00 | (2006.01) |
| B29K 309/08 | (2006.01) |

(52) U.S. Cl.
CPC ...... *B29C 49/0015* (2013.01); *B29C 49/0042* (2013.01); *B29C 53/30* (2013.01); *F16L 11/112* (2013.01); *F16L 11/115* (2013.01); *B29C 49/22* (2013.01); *B29C 2049/0089* (2013.01); *B29C 2049/4608* (2013.01); *B29C 2791/006* (2013.01); *B29K 2027/12* (2013.01); *B29K 2105/06* (2013.01); *B29K 2105/0827* (2013.01); *B29K 2105/0845* (2013.01); *B29K 2105/258* (2013.01); *B29K 2305/00* (2013.01); *B29K 2309/08* (2013.01); *B29K 2705/00* (2013.01); *B29L 2023/18* (2013.01); *B29L 2031/711* (2013.01)

(58) Field of Classification Search
None
See application file for complete search history.

(56) References Cited

U.S. PATENT DOCUMENTS

| | | |
|---|---|---|
| 2,396,059 A | 3/1946 | Roberts |
| 2,785,382 A | 3/1957 | Lamb |
| 2,936,812 A | 5/1960 | Roberts |

(Continued)

*Primary Examiner* — Monica Huson
(74) *Attorney, Agent, or Firm* — Howard & Howard Attorneys PLLC

(57) ABSTRACT

A seamless convoluted hose assembly. The assembly includes: a tubular inner liner having an outer surface, an inner surface, and an inner liner wall therebetween which defines a passageway. The assembly further includes a helical coil or a plurality of annular loops which produce convolutions in the outer surface of the tubular liner when the tubular inner liner is forced through the helical coil or plurality of loops under heat and pressure.

18 Claims, 5 Drawing Sheets

(56) References Cited

U.S. PATENT DOCUMENTS

| | | | |
|---|---|---|---|
| 3,172,428 | A | 3/1965 | Tudge |
| 3,486,532 | A | 12/1969 | Sawada |
| 3,599,677 | A | 8/1971 | O'Brien |
| 4,096,888 | A | 6/1978 | Stefano et al. |
| 4,279,679 | A | 7/1981 | Sheppard |
| 4,360,493 | A | 11/1982 | Kramer et al. |
| 4,811,761 | A | 3/1989 | Huvey |
| 4,957,687 | A | 9/1990 | Akman et al. |
| 5,275,208 | A | 1/1994 | Lawrence |
| 5,435,962 | A | 7/1995 | Kramer, Jr. |
| 5,485,870 | A | 1/1996 | Kraik |
| 5,555,915 | A | 9/1996 | Kanao |
| 5,613,524 | A | 3/1997 | Martucci |
| 6,024,132 | A | 2/2000 | Fujimoto |
| 6,948,527 | B2 | 9/2005 | Ragner et al. |
| 7,516,762 | B2 | 4/2009 | Colbachini |
| 2001/0018933 | A1 | 9/2001 | Martucci et al. |
| 2006/0124189 | A1 | 6/2006 | Burke et al. |
| 2010/0108170 | A1 | 5/2010 | Chudkosky et al. |

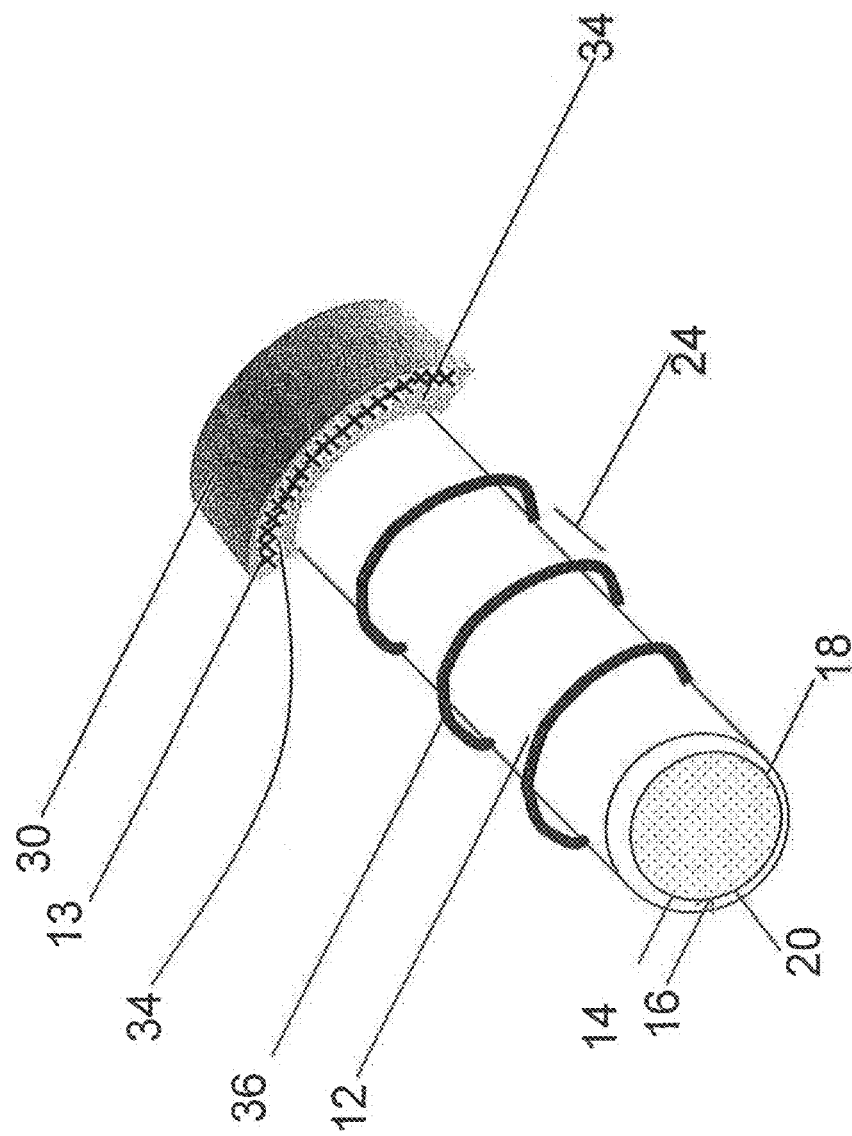

METHOD OF MAKING CONVOLUTED COATED BRAIDED HOSE ASSEMBLY

CROSS-REFERENCE AND INCORPORATION BY REFERENCE

This patent application is a Continuation of U.S. patent application Ser. No. 13/296,353, filed Nov. 15, 2011, and entitled "Method of Making Convoluted Coated Braided Hose Assembly" which, in turn, is a Divisional of U.S. patent application Ser. No. 12/355,191, filed Jan. 16, 2009, and entitled "Convoluted Coated Braided Hose Assembly And Method Of Making Same", now U.S. Pat. No. 8,418,729. U.S. Divisional patent application Ser. No. 13/296,353 and U.S. patent application Ser. No. 12/355,191 are hereby incorporated by reference in their entireties.

FIELD OF THE INVENTION

The present invention relates to a hose assembly. More specifically, the present invention relates to a hose assembly for conducting fluid therethrough, preferably in automotive applications such as conducting fuel, brake fluids, and the like.

BACKGROUND OF THE INVENTION

Hose assemblies used to carry fuel and other corrosive materials are well known in the art. Such assemblies are exposed to a variety of fuel mixtures, fuel additives, and caustic materials in addition to being exposed to extreme temperatures. Thus, such hose assemblies must be resistant to chemical, environmental, and physical degradation as a result of chemical exposure, environmental exposure to heat, and physical degradation resulting from bending and repeated movement or forces applied to the assembly.

Polymeric fluorocarbon materials such as polytetrafluoroethylene possess the requisite chemical and temperature resistant properties for most fuel hose applications. Unfortunately, polymeric fluorocarbon materials exhibit relatively poor tensile and hoop strengths. As a consequence, such fluorocarbon materials are prone to kinking. The kinking, which can easily become permanent, provides a continual resistance to the fluid flow through the hose assembly.

A well known approach to providing kink resistance to a hose is to incorporate convolutions as shown in U.S. Pat. No. 3,023,787 to Phillips et al. The Phillips et al. patent discloses a convoluted hose assembly having a fluorocarbon inner liner constructed of many layers of helically wrapped Teflon® tape.

Convoluted hose assemblies of the type described in the Phillips et al. patent have several inherent drawbacks. Convoluted hoses in general have a strong tendency to elongate; that is, the convolutions flatten as pressurized fluid moves through them, and this flattening causes the hose to grow in a longitudinal direction. More specifically, because the inner liner in the Phillips et al. hose assembly is formed by helically wrapping layers of a fluorocarbon tape, the seams created by this wrapping are inherently weak and prone to leakage and bursting under internal pressures and prolonged movement. In addition, the seams create undulations within the inner liner which cause disruption in the flow of liquids therein which could give rise to increased electrical charge buildup within the hose.

There are also strong disadvantages inherent in known methods of making convoluted hose. Existing methods are wasteful of costly fluorocarbon materials. In the type disclosed in the Phillips et al. patent, the convolutions are formed by crimping a length of hose straight hose, resulting in a much shorter hose as the end product. The creation of a tube from overlapping winds of tape also wastes expensive materials in the regions of overlap and requires complex, time consuming and labor intensive steps. Finally, hoses of the type disclosed by Phillips et al. do not lend themselves easily to production in a single, continuous, integrated process.

Therefore it would be desirable to have a convoluted hose assembly which with properties of resistance to kinking, bursting, and elongation that are superior to those of existing convoluted hoses. Further, it would be desirable to have a method of making such a convoluted hose assembly in a simple, continuous process, without introducing internal seams, while minimizing the use of costly fluorocarbons and labor in the construction process.

SUMMARY OF THE INVENTION

According to the present invention, there is provided a seamless convoluted hose assembly including a tubular inner liner having an outer surface, an inner surface, and an inner liner wall therebetween which defines a passageway. The assembly further includes a helical coil or a plurality of annular loops which produce convolutions in the outer surface of the tubular liner when the tubular inner liner is forced through the helical coil or plurality of loops under heat and pressure. Also provided is a method of forming a seamless convoluted hose assembly including the steps of applying radially outward pressure and heat to an inner surface of a meltable, expandable tubular inner line; and producing convolutions by restricting outward expansion of a first plurality of segments of an inner liner wall of the tubular inner liner while allowing outward expansion of a second plurality of segments of the inner liner wall of the tubular inner liner, each member of the first plurality of segments being adjacent to a member of the second plurality of segments, the first plurality of segments thereby becoming the valleys of a plurality of convolutions, and the second plurality of segments becoming the peaks of the plurality of convolutions.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a perspective view of an alternative embodiment of the invention.

DETAILED DESCRIPTION OF THE INVENTION

A novel method is provided for making a convoluted hose. The convolutions are not produced by crimping a straight walled hose nor by creating convolutions out of spiral windings of tape. Instead, convolutions are created by expanding the walls of a straight walled tube by the application of heat and pressure, while simultaneously restricting the outward expansion of the wall segments destined to become the valleys of convolutions. This restriction can be accomplished by convolution producing means such as a convolution producing coil or a series of annular rings wrapped about the tube prior to the application of heat and pressure. When heat and pressure are applied, segments of the tube wall that are restricted by the coil or rings remain at their original diameter, to become the valleys of convolutions. Segments of the tube wall not restricted by the coil or rings expand outward to form the peaks of convolutions, as in FIG. 2. Preferably the pressure is directed radially outward from a passageway 20 in a tubular inner liner 12. This pressure can be created by pressurizing passageway 20 with an inert gas such as nitrogen or; alternatively, performing the expansion in an evacuated chamber. Alternatively, pressure may be exerted radially inward toward the passageway 20, for example by pulling a vacuum in passageway 20, or performing the expansion in a pressurized chamber. In this case, convolutions are formed by expansion of the walls inward into the passageway 20 as in FIG. 3.

Figure 1:
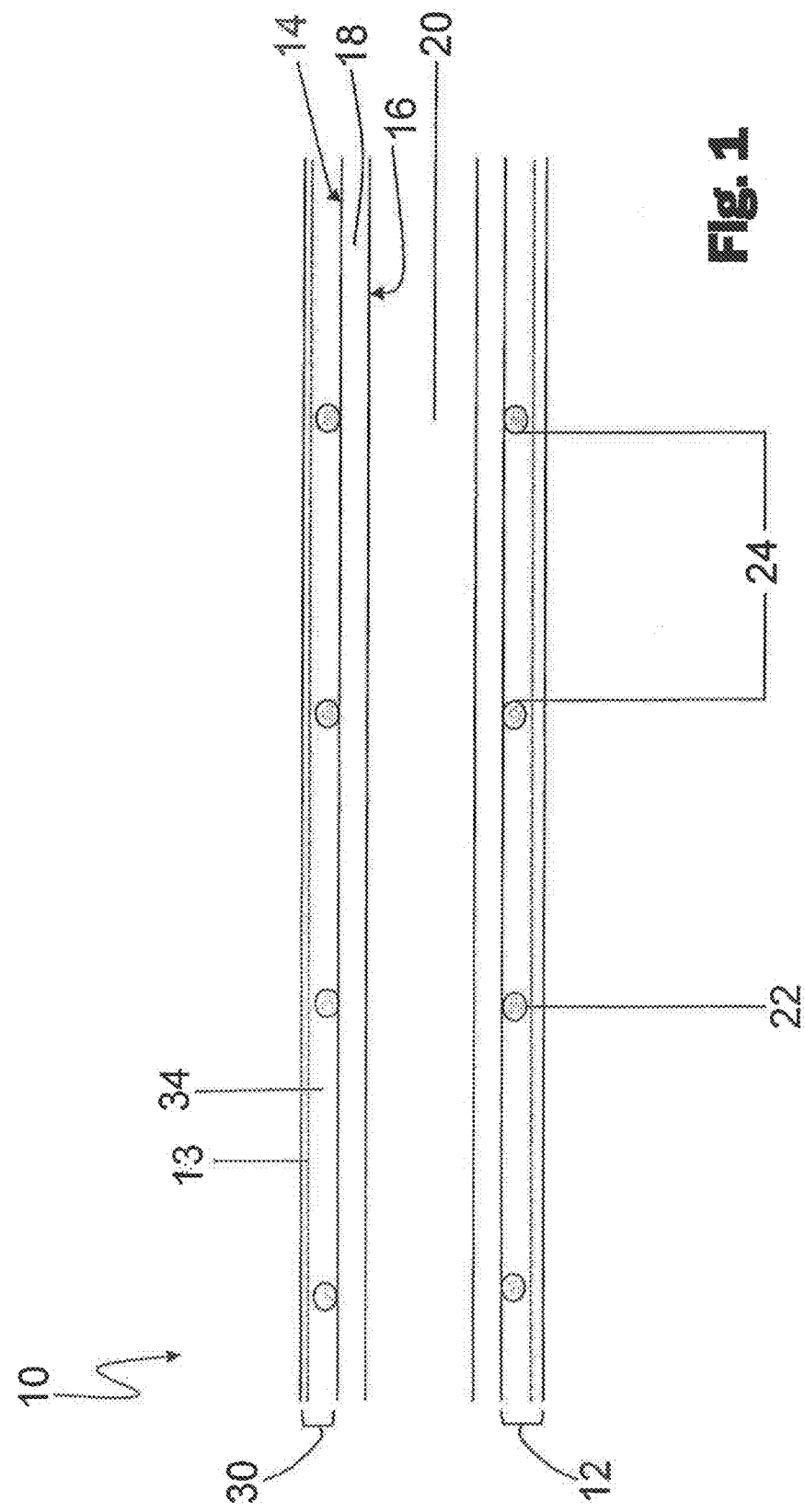
FIG. 1 is a longitudinal sectional view of the hose assembly prior to formation of convolutions.
Figure 2:
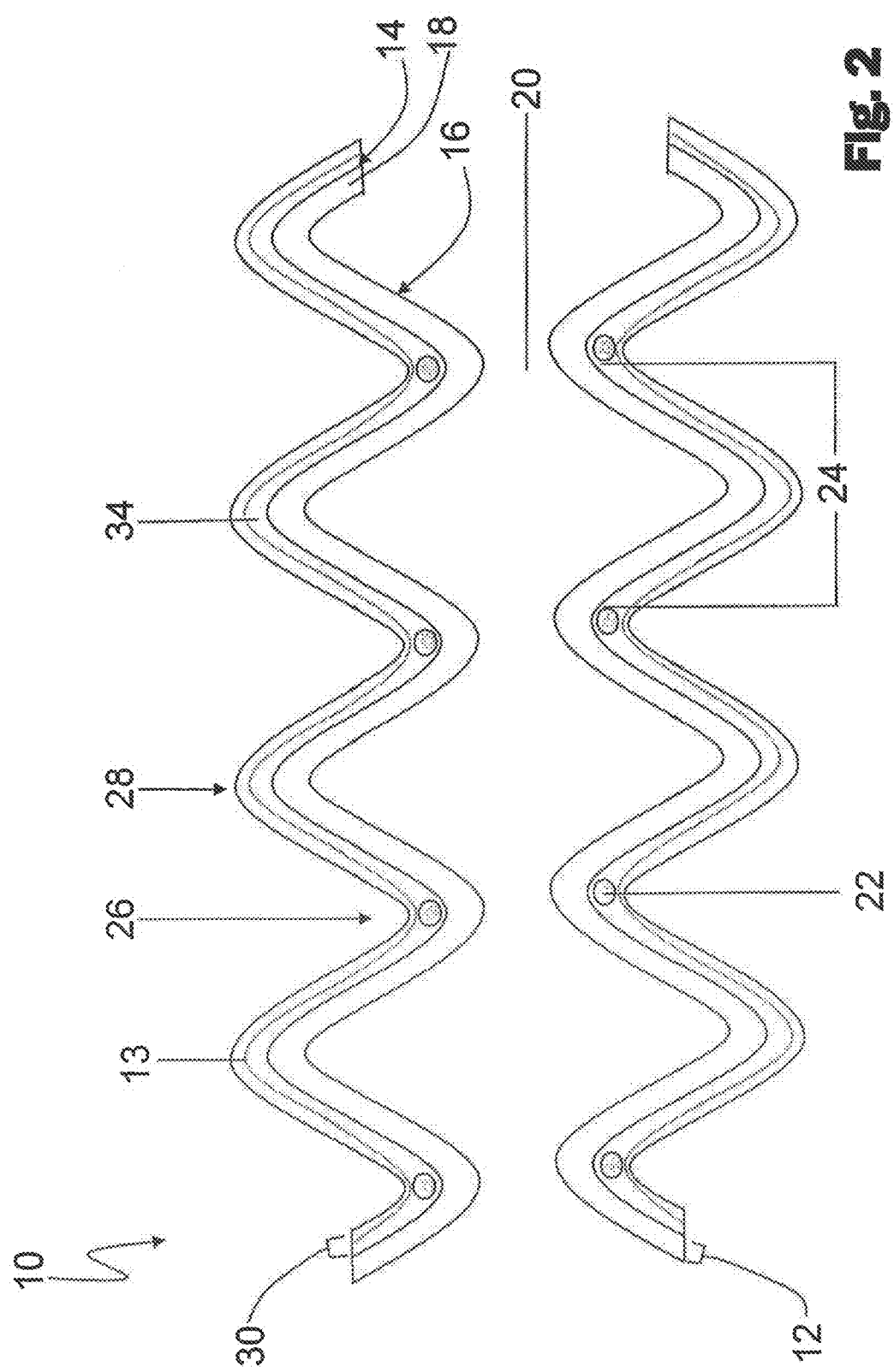
FIG. 2 is a longitudinal sectional view of the hose assembly after the formation of convolutions by outward expansion.
Figure 3:
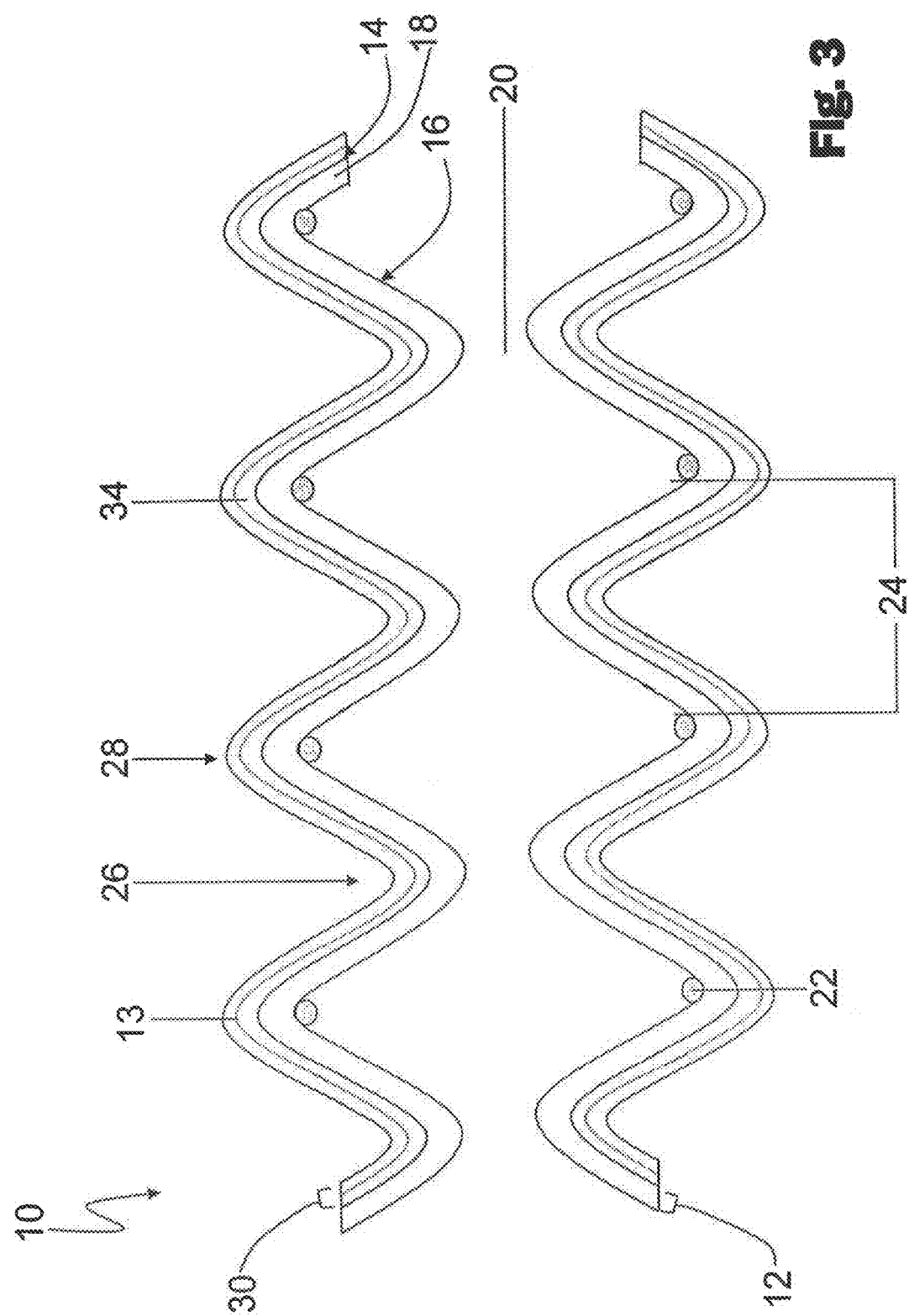
FIG. 3 is a longitudinal sectional view of the hose assembly after the formation of convolutions by inward expansion.
Figure 4:
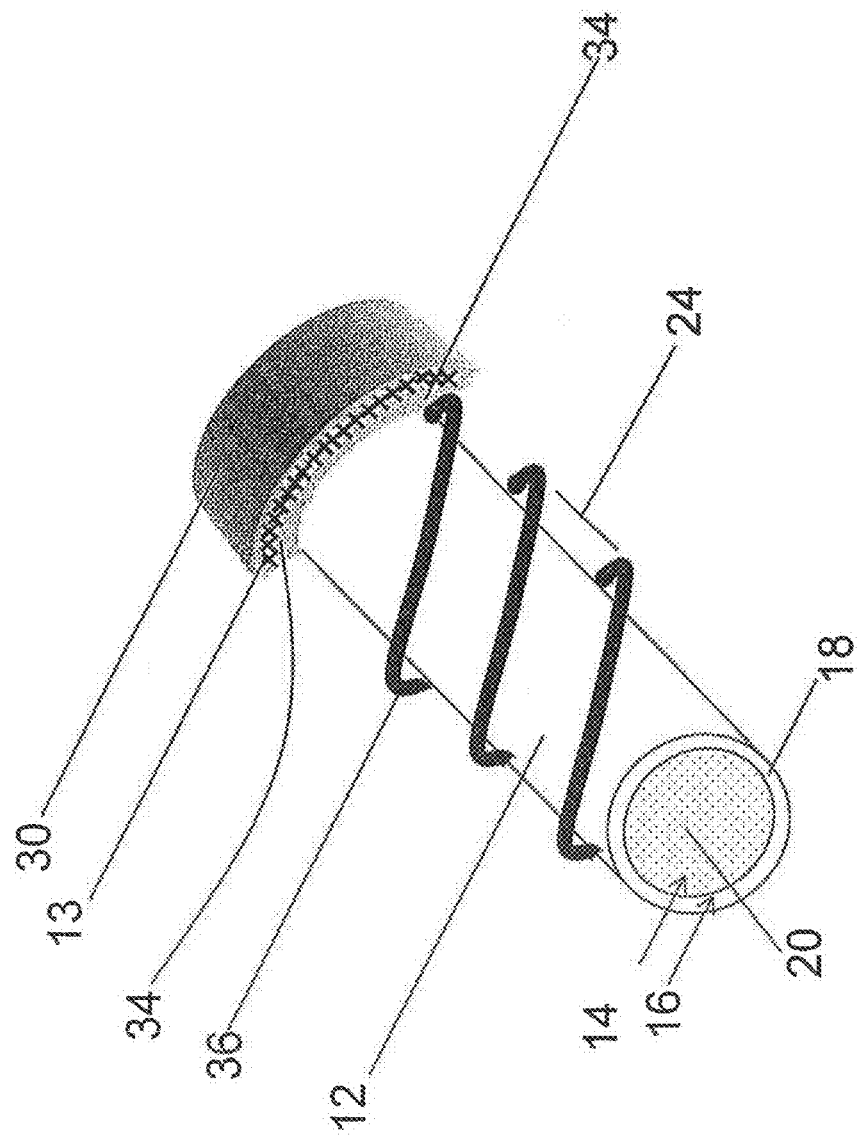
FIG. 4 is a perspective view of the preferred embodiment of the invention.

An example of the process is shown in FIGS. 1 and 2 depicting the inner liner 12 of the hose assembly 10 being expanded or formed outwardly by pressure directed radially outward, and a helical coil provides the loops 22 that produce convolutions. Preferably, the inner liner 12 comprises meltable, expandable polymeric fluorocarbon material, and the helical coil comprises glass yarn, plastic, or metallic wire, or a combination of at least two of those materials. Whether expansion is inward or outward, the expansion causes thinning of the walls of the inner liner wall 18 in the peak of each convolution, rather than causing the hose assembly to shorten, as is the case in prior art processes which produce convolutions by crimping a hose.

The expansion of the peaks of the convolutions may be limited by controlling the heat exerted on the inner liner wall 18, by controlling the gas pressure exerted on the inner liner wall 18, by controlling the amount of time of exposure of the inner liner wall 18 to elevated temperatures and/or pressures, or by controlling any combination of heat, pressure, or timing. Preferably expansion is limited by the presence of an outer reinforcing layer 30 which is applied to the inner liner 12 and convolution producing 36 means prior to the application of heat and pressure. Preferably the outer reinforcing layer comprises braided or woven fibers 13 coated by outer coating 34 of an organic polymer. The organic polymer may be foamed, i.e. composed of a closed cell fluorocarbon polymer foam as disclosed in U.S. Pat. No. 5,613,524 to Martucci. A foamed outer coating 34 has the advantage of decreasing weight and use of materials. Outer coating 34 also adds strength, as desired, to peaks of convolutions, which thin during the expansion process.

The method of the present invention permits the construction of a convoluted hose assembly in a single, simple, continuous process, without need of the costly and laborious process of wrapping tape to form convolutions. In addition, waste of costly fluorocarbon materials is minimized, as the hose is not shortened as it is in processes required crimping of a straight hose into a shorter convoluted hose.

The product of the present invention is a convoluted hose assembly 10 with properties not seen heretofore in convoluted hoses. The convolutions themselves do more than resist kinking. They also confer hoop strength, tensile strength, and resistance to bursting. This is because the means of producing the convolutions, such as a helical coil of glass yarn or wire braid, is incorporated directly into the convolutions themselves. Another advantage of the hose assembly is that the interior wall of the inner liner is smooth and seamless, reducing the dangerous turbulence that can be induced in volatile fluids passing over seams, as well as the danger of bursting caused by seam failure. The entire hose assembly resists the usual tendency of convoluted hoses to elongate under pressure because the convolutions are bonded to a reinforcing outer layer whose reinforcing braid, is preferably at neutral braid angle, an arrangement which neutralizes elongation. The assembly also displays unusual burst strength relative to previous convoluted hoses because the neutral braid angle of the bonded reinforcing layer also resists increases in diameter, and therefore resists outward expansion by the pressure of fluids traveling through the hose. This allows the hose to conduct fluids at higher working pressure without bursting. The bonding of the layer to the inner liner also prevents movement of the inner liner the outer reinforcing layer.

The preferred method for making a hose assembly 10 is as follows. An inner liner 12 of organic polymer is provided. Specifically, the inner tubular member 12 of a fluorocarbon polymer is extruded. The hose assembly 12 includes an inner organic polymeric liner 12. The liner 12 is preferably extruded and has a wall thickness of between 0.001 and 0.120 inches. The inner liner 12 is preferably made of a meltable fluorocarbon polymer. By melt extrudable fluorocarbon polymeric material, it is meant that the material, at suitable conditions such as raised temperature, can be caused to melt or flow, or deform such that such that it will expand under pressure and/or flow into other layers of the hose assembly. Preferably, the inner liner is made of the polymer of tetrafluoroethylene (PTFE), the polymer of fluorinated ethylene propylene (FEP), the polymer of perfluoroalkoxy resin (PFA), or the polymer of ethelyne-tetrafluoroethylene (ETFE). The fluorocarbon polymers PTFE, FEP, and PFA are sold under the trademark TEFLON by Dupont. The polymer ETFE is sold under the trademark TEFZEL by Dupont.

The inner liner 12 is impervious to flow through the wall. Since the inner liner 12 is preferably made of a fluorocarbon polymer material, it is resistant to both heat and chemical degradation. This allows a variety of fluids, particularly vehicle fuels, to pass through the interior of the liner 12 without corroding the liner 12. The impermeability of the inner liner 12 is also an advantage when the fluid being conducted is a gas, as in vapor management applications.

A novel feature of the present invention is the incorporation of convolution producing means which causes the inner liner 12 to be thrown into seamless convolutions during expansion, in a continuous process which causes little shortening of the liner and thus little waste of costly materials. In a preferred embodiment, means for producing convolutions includes a plurality of loops 22 wound about the inner liner, most preferably in the form of a helix, although individual annular rings may also be used.

Glass fiber, such as a yarn of fiberglass, or metallic wire, preferentially stainless steel wire, are the preferred materials for constructing a convolution inducing helix. Glass fibers provide the necessary strength needed to restrict the outward expansion of the inner liner 12 and are heat resistant which is important for use in the high temperatures utilized in production and encountered during use. Importantly, the convolution inducing helix remains incorporated into the finished hose, increasing both the tensile strength and hoop strength of both the liner 12 and the hose assembly 10 as a whole. In a preferred embodiment, the glass fibers are tightly woven such that the gaps and spaces between the adjacent fibers are minimized. The shape and depth of the convolutions will depend on the shape and thickness of the yarn. The heavier the yarn, the deeper the resulting convolutions and the more resistant the hose assembly will be to kinking. The flatter and more ribbon-like the yarn, the broader the valleys of the resulting convolutions. Unusual yarn shapes, such as square or triangular cross sections, will produce convolutions with flat or wedge shaped valleys. Alternatively, the convolution producing means can be constructed of wire.

The convolution producing means is preferably positioned about the outer surface 14 of the inner liner 12, but it may also be positioned on the inner surface 16. In this configuration, it will produce convolutions under either radially outward application of pressure passageway 20 of inner liner 12, preferably exerted by pressurization of passageway 20 with a gas, preferably an inert gas, and most preferably nitrogen. Alternatively, the radially outward pressure in passageway 20 may be induced by carrying out convolution production in a vacuum chamber, and leaving passageway 20 at atmospheric pressure. Convolutions can also be produced by expanding the walls of the inner liner 12 into the interior passageway 20 of the inner line, by either applying vacuum to the inner passageway 20 or by applying pressure to the exterior of inner liner 12. In this case, the loops of the convolution producing means will define the valleys of convolutions and the inter-loop spaces will define the peaks.

To position the convolution inducing means 36 about the outer surface 14 of the inner liner 12, a material such as glass yarn is preferably applied about the outer surface 14 by utilizing a braiding machine well known in the art. The machine includes at least one spool which carries a pre-twisted yarn. Alternatively, glass fiber may be spun into yarn during the application process. In this method, the machine includes a plurality of spools which carry the fiber material, the fibers are fed through the machine to a braiding area, and in the braiding area, the fibers are braided or wound about the inner liner 12 to form a convolution producing means such as a helical coil. Alternatively, convolution inducing means can be positioned by utilizing a braiding machine loaded with plastic or metal wire instead of glass fiber. The metal wire is preferably made of stainless steel, but it can be of any suitable metal material known in the art. If it is desired that convolution producing means be positioned against an inner surface 16 of the tubular inner liner 12, as in FIG. 3, as a helix or a plurality of annular loops may be positioned against inner surface 16 by means of a mandrel or other machine known in the art.

After application of a helix or other convolution producing means, the inner liner is heated to a temperature sufficient to soften at least the outer wall of the liner. For the preferred polyfluorocarbon polymer material, the preferred heat application is 500.degree. F.-750.degree. F. Once the desired degree of softening is reached, convolutions can be formed expanding the walls of the inner liner against the convolution producing helix. This is preferably done by applying positive radially outward pressure to the interior passageway 20 of the inner liner, preferably by filling this passageway with nitrogen gas at 1-200 p.s.i. Alternatively, the inner liner can be expanded against the convolution producing helix by pulling a vacuum in the outer chamber. Preferably this vacuum is in the range of 2-17 inches of mercury.

The depth of the resulting convolutions can be controlled through the amount of heat, the amount of pressure exerted, and the thickness of the inner liner 12. Convolutions can be excluded from reaching the inner surface 16 of inner liner 12 so that the resulting hose has a passageway 20 with a smooth bore. This can be accomplished by using a relatively thick walled liner and by applying relatively low pressure and temperature. Conversely, convolutions may be made to reach the inner surface 16 to produce a hose whose interior passageway 20 has a bore that undulates along with the convolutions. This result can be achieved by using a liner with relatively thin walls, and relatively high pressure and temperature.

Outward expansion of convolutions of the inner liner 12 can be limited by adjusting the temperature and pressure. The inner passageway 20 of the inner liner 12 can for example be cooled by passing through it a fluid or gas having a temperature lower than the melting temperature of the particular fluorocarbon material. For example, the fluid can be air or water.

Preferably, however, outward expansion of the convolutions is limited by an outer reinforcing layer 30, which is applied to the outer surface 14 of the inner liner 12 prior to outward expansion. The outer reinforcing layer 30 comprises braided material 13 coated by an organic polymeric dispersion or coating 34. As stated above, the outer reinforcing layer 30 increases the hoop strength, tensile strength, resistance to bursting, and resistance to elongation, of the hose assembly. The braided material 13 can comprise any suitable metallic or nonmetallic material known in the art. Preferably the fibers are glass fiber. Glass fibers provide the necessary strength. Further, glass fibers are heat resistant which is important for use in heated environments and for making the assembly as will be described subsequently. Alternatively, the braided material can be composed of a suitable metal such as stainless steel. The braided material 13 can be disposed in interleaving fashion or wrapped tightly about the inner liner 12. Preferably, the braided material is bonded to the outer surface 14 of the inner liner 12 and to the convolution producing means 36 by an outer coating 34, preferably a coating of organic polymer.

To create the preferred reinforcing layer 30, braided or woven fibers 13 are applied about the outer surface 14 of the inner liner 10 and the convolution inducing means 36. Preferably, application of the fibers is performed with a braiding machine which is well known in the art and described above. The braided or woven fibers 13 may be tightly wound or they may be loosely wound about the inner liner 12 having wide gaps between adjacent fibers. In the preferred embodiment, the braided or woven fibers 13 are tightly woven such that the gaps or spaces between adjacent fibers is minimal. An organic polymeric material is dispersed about the woven or braided fibers 13 and is located from the outer periphery of the woven or braided fibers 13 radially inwardly toward the inner liner 12. The organic polymeric material is deposited in the interstices of the braided or woven fibers 13. This outer coating 34 preferably comprises a fluorocarbon polymer. Specifically, it comprises the polymer of tetrafluoroethylene (PTFE), the polymer of fluorinated ethylene propylene (FEP), the polymer of perfluoroalkoxy resin (PFA), or the polymer of ethylene-tetrafluoroethylene (ETFE).

The organic polymeric outer coating 34 covers or coats the braided or woven fibers 13 from the outer periphery radially inwardly. Preferably, after the braided or woven fibers 13 have been coated, each fiber is discernible, so that, in effect, the outer reinforcing layer 30 comprises a organic polymeric having the woven or braided fibers 13 therein.

Preferably, the organic polymeric material is a fluorocarbon polymer in a dispersion. In other words, the organic polymeric dispersion or coating, as applied, comprises the fluorocarbon polymer and at least one carrying fluid. The preferable fluid is water. It will be appreciated that any suitable fluid may be used. The fluorocarbon polymer solution coats or is dispersed throughout the entirety of the braided or woven fibers 13. After the coating is complete, the carrying fluid is removed from the dispersion by drying. This leaves an organic polymeric dispersion or coating dispersed throughout woven or braided material 13.

The preferred method of coating the braided or woven layer 13 is to pass the inner liner 12 and convolution producing means 36 through a reservoir containing a dispersion of an organic polymeric material and at least one carrying fluid. Alternatively, the dispersion may be sprayed onto braided material. The assembly 10 is sent to a dryer, a preheat oven which is preferably below the boiling temperature of the fluid (water). By utilizing an oven below the boiling temperature of the carrying fluid, a bubbling effect is avoided in the final product. The temperature can be above the boiling temperature, however, the assembly 10 may contain many air bubbles in the outer coating 14 if higher temperatures are used. The carrying fluid (water) is removed to leave a coating of an organic polymeric material dispersed throughout the braided or woven fibers 13. The assembly 10 is then sintered at a suitable temperature (roughly 700 degree F.) to cure the organic polymeric coating 14.

Note that it is not necessary that both the inner liner 12 and organic polymeric dispersion or coating be of the same fluorocarbon polymer, although they may be. For example, the inner liner 12 may be made of PFA while the coating 13 is made of PTFE. Any combination of the fluorocarbon polymers listed may be utilized for the inner liner 12 and coating 34. Alternatively, if weight and cost of materials is of special concern, the tubular inner liner 12, the fluorocarbon polymers utilized either the inner liner 12, the outer reinforcing layer 30, or both, may be constructed of closed cell fluorocarbon polymer foam as disclosed in U.S. Pat. No. 5,613,524 to Martucci Preferably, the outer reinforcing layer 30 can be bonded entirely to the outer surface 14 of the inner liner 12, so that it conforms exactly each peak 28 and valley 26 of the convolutions. This convolution-hugging configuration can be achieved by applying coating 34 by dipping inner liner 12 into a bath of coating material. An advantage of this configuration is that the convolutions are displayed on the exterior of the hose assembly as in FIG. 1. This permits convolutions to be interlocked at a desired angle at bends in the hose assembly, which further reduces the possibility of kinking at such bends. Alternatively the outer reinforcing layer 30 can be in intermittent contact with the inner liner 12, for example contacting the inner liner at only the peak 28 of each convolution. This configuration can be achieved by adjusting coating 34 to an appropriate viscosity and applying coating 34 not by dipping but with an applicator device such as doctor wheels. An advantage of this intermittent contact configuration is lighter weight and conservation of materials. In addition, the presence of gas filled gaps between reinforcing layer 34 and inner liner 12 can provide insulating properties.

In an alternative embodiment a helix, preferentially made of wire, can be disposed within the inner liner 12. Vacuum within the liner 12 or pressure outside of the liner 12 can be used to draw the liner material inwardly to form the convolutions. Heat is also usually required, depending on the material.

An advantage of the present invention is that all steps can be performed in a single continuous process. All components of the assembly 10, including the inner liner 12, convolution inducing means 36, and outer reinforcing layer can be assembled, and the production of convolutions and the sintering of the outer coating 34 may be performed by appropriately timed heating and cooling steps.

The assembly 10 can further include coupling means such as the quick coupling device disclosed in U.S. Pat. No. 5,931,510 to Mathew and Martucci, so that the assembly can be connected to an external device.

As fluid flows through the inner liner 12, electrical charges tend to build throughout the length of the inner liner 12. In order to prevent these electrical charges from accumulating, the inner liner 12 can include an integral longitudinal conductive means coextensive with the length of the inner liner 12 for conducting an electrical charge through the liner. Preferably, the inner liner 12 has a conductive strip of carbon black. This carbon black is electrically conductive and will dissipate any electrical charges built up by the fluid. Alternatively, the whole inner tubular member 12 can comprise the conductive means. This is done by using carbon black about the entire inner liner 12. The outer reinforcing layer 30 is preferably electrically non-conductive. This is important in that electrical changes applied to the exterior of the outer coating 14 will not be conducted throughout the length of hose assembly 10 or to the fluid passing through the interior of the internal passageway 20 of the inner liner 12. It will be appreciated that other conductive material may be used to form the conductive strip 16.

The invention has been described in an illustrative manner, and it is to be understood that the terminology which has been used is intended to be in the nature of words of description rather than of limitation.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed:

1. A method of forming a seamless convoluted hose assembly including the steps of:
   providing a meltable, expandable, tubular inner liner having an outer surface, an inner surface and an inner liner wall therebetween defining a passageway,
   applying pressure from the passageway and applying heat to the inner surface of the meltable, expandable tubular inner liner; and
   restricting outward expansion of a first plurality of segments of an inner liner wall of the tubular inner liner while allowing outward expansion of a second plurality of segments of the inner liner wall of the tubular inner liner, each member of the first plurality of segments being adjacent to a member of the second plurality of segments, the first plurality of segments thereby becoming valleys of a plurality of convolutions, and the second plurality of segments becoming peaks of the plurality of convolutions, wherein expansion of the tubular inner liner results in thinning of walls of the inner liner wall in the peak of each convolution, wherein applying pressure from the passageway includes exerting a radially inward pressure with a vacuum.

2. The method as set forth in claim 1, wherein said step of applying pressure and heat further comprises pressurizing the tubular inner liner with inert gas and applying heat sufficient to expand the walls of the tubular inner liner.

3. The method as set forth in claim 1, wherein said step of restricting outward expansion of a first plurality of segments of an inner liner wall of the tubular inner liner further includes the step of positioning convolution producing means about the tubular inner liner.

4. The method as set forth in claim 1, wherein positioning convolution producing means about the tubular inner liner further includes the step of positioning convolution producing means exterior to the outer surface of the tubular inner liner.

5. The method as set forth in claim 1, wherein positioning convolution producing means about the tubular inner liner further includes the step of positioning convolution producing means interior to the inner surface of the tubular inner liner.

6. The method as set forth in claim 1, wherein positioning convolution producing means about the tubular inner liner further includes positioning a helical coil about the tubular inner liner.

7. The method as set forth in claim 1, wherein positioning convolution producing means about the tubular inner liner further includes positioning a plurality of annular loops about the tubular inner liner.

8. The method as set forth in claim 3, wherein convolution producing means comprises glass fiber.

9. The method as set forth in claim 3, wherein convolution producing means comprises metallic wire.

10. The method as set forth in claim 1, further including the step of limiting the outward expansion of the plurality of convolutions.

11. The method as set forth in claim 10, wherein limiting the outward expansion of the plurality of convolutions further includes the step of positioning an outer reinforcing layer exterior to the outer surface of the tubular inner liner and to convolution producing means.

12. The method as set forth in claim 11 wherein positioning an outer reinforcing layer further comprises positioning braided glass fiber.

13. The method as set forth in claim 11, wherein positioning an outer reinforcing layer further comprises positioning braided wire.

14. The method as set forth in claim 11, wherein positioning an outer reinforcing layer exterior to the outer surface of the tubular inner liner and to convolution producing means further includes bonding together the outer reinforcing layer, the outer surface of the tubular liner and convolution producing means by coating with an outer coating.

15. The method as set forth in claim 14, wherein coating with an outer coating further includes coating the outer reinforcing layer, the outer surface of the tubular liner and convolution producing means with the fluorocarbon polymer dispersion, and sintering to cure the fluorocarbon polymer dispersion into a fluorocarbon polymer coating.

16. The method as set forth in claim 1, wherein the tubular inner liner comprises a meltable expandable polymeric fluorocarbon material selected from a group consisting of the polymer of tetrafluoroethylene, the polymer of fluorinated ethylene propylene; the polymer of perfluoroalkoxy; and the polymer of ethylene-tetrafluorethylene.

17. A method of forming a seamless convoluted hose assembly including the steps of:

providing a meltable, expandable, tubular inner liner having an outer surface, an inner surface and an inner liner wall therebetween defining a passageway, applying pressure from the passageway and applying heat to the inner surface of the meltable, expandable tubular inner liner;

restricting outward expansion of a first plurality of segments of an inner liner wall of the tubular inner liner while allowing outward expansion of a second plurality of segments of the inner liner wall of the tubular inner liner, each member of the first plurality of segments being adjacent to a member of the second plurality of segments, the first plurality of segments thereby becoming valleys of a plurality of convolutions, and the second plurality of segments becoming peaks of the plurality of convolutions, and placing an electrically conductive member within the inner liner and preventing electrical charges from accumulating within the inner liner in response to a flow of fluid therethrough with the electrically conductive member, wherein expansion of the tubular inner liner results in thinning of walls of the inner liner wall in the peak of each convolution.

18. The method as set forth in claim 17, wherein the electrically conductive member is a conductive strip of carbon black.

* * * * *